(12) United States Patent
Medan

(10) Patent No.: US 10,437,508 B1
(45) Date of Patent: Oct. 8, 2019

(54) REPLICATING A STORAGE ENTITY STORED IN A GIVEN STORAGE SYSTEM TO MULTIPLE OTHER STORAGE SYSTEMS

(71) Applicant: Infinidat Ltd.

(72) Inventor: Yoav Medan, Haifa (IL)

(73) Assignee: .INFINIDAT LTD, Herzliya (IL)

( * ) Notice: Subject to any disclaimer, the term of this patent is extended or adjusted under 35 U.S.C. 154(b) by 65 days.

(21) Appl. No.: 15/672,331

(22) Filed: Aug. 9, 2017

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
USPC ....................................................... 711/162
See application file for complete search history.

(56) References Cited

U.S. PATENT DOCUMENTS

| | | | | |
|---|---|---|---|---|
| 9,804,925 B1* | 10/2017 | Carmi | ................. | G06F 11/1412 |
| 2006/0161460 A1* | 7/2006 | Smitherman | .......... | G06Q 50/24 |
| | | | | 705/3 |
| 2011/0213994 A1* | 9/2011 | Thereska | .............. | G06F 1/3221 |
| | | | | 713/320 |
| 2013/0191336 A1* | 7/2013 | Ducott, III | ........ | G06F 17/30578 |
| | | | | 707/634 |
| 2014/0304230 A1* | 10/2014 | Simon | ............... | G06F 17/30575 |
| | | | | 707/634 |
| 2014/0337457 A1* | 11/2014 | Nowoczynski | ... | G06F 15/17331 |
| | | | | 709/212 |
| 2015/0261455 A1* | 9/2015 | Gough | .................... | G06F 11/14 |
| | | | | 714/6.24 |
| 2017/0031671 A1* | 2/2017 | Joshi | ....................... | G06F 8/654 |

* cited by examiner

*Primary Examiner* — Hiep T Nguyen
(74) *Attorney, Agent, or Firm* — Reches Patents

(57) ABSTRACT

A storage system, a computer program product and method for replicating a storage entity to a group of storage systems. The method may include splitting the storage entity, by a given storage system, to provide storage entity portions; generating, by the given storage system, storage entity portions information for distributing the storage entity portions between all storage systems of the group so that each storage system of the group eventually receives the storage entity portions; transmitting the storage entity portions, from the given storage system, to storage systems of the group; wherein the transmitting comprises transmitting different storage entity portions from the given storage system to different storage systems of the group; sending, by the given storage system, the storage entity portions information to at least some storage systems of the group; and attempting to verify, by the given storage system, that all the storage systems of the group received all the storage entity portions.

19 Claims, 8 Drawing Sheets

US 10,437,508 B1

REPLICATING A STORAGE ENTITY STORED IN A GIVEN STORAGE SYSTEM TO MULTIPLE OTHER STORAGE SYSTEMS

BACKGROUND

Replicating data to a secondary remote site is an approach commonly used for the purpose of data protection and mirroring. For some organizations, a secondary copy may not be sufficient and a tertiary copy or even more remote copies may be required, especially when the organization is highly distributed or when a higher level of data protection is required.

There are two principal solutions for replicating content to multiple locations. According to one solution, called one-to-many replication, a single source system replicates the same content in parallel to multiple remote sites. A second solution suggests cascading the copying process, where the copying is done by a chain of sequential hops across multiple systems, i.e., the source system transmits the content to a second site, and only when the content is received at the second site, the second site can continue the content's propagation towards a third system.

In the first solution of one-to-many, where multiple replications run simultaneously by the source system, the content arrives at the destination sooner than it would if using the sequential process of the cascaded replication, where in the latter, each replication to the next hop can start only when the previous replication has completed, causing a substantial latency (from the start of the copying process until received by all destinations). On the other hand, the one-to-many replication utilizes more network bandwidth at the source system and may also consume more computing and memory resources of the source system. Furthermore, when the replication to one of the multiple destinations proceeds faster than the replication towards a second destination, the replication process will be either slowed down to the pace of the slower destination or the replication process will lose its parallelism advantage and may become more complicated if the replication towards each destination is handled autonomously, so as to adjust to the pace of each destination.

There is a need for a copying process towards multiple destinations that balances the workload across participating systems, while minimizing the latency of copying to all destinations.

SUMMARY

There may be provided a method.

A method for replicating a storage entity to a group of storage systems, the method may include splitting the storage entity, by a given storage system, to provide storage entity portions; generating, by the given storage system, storage entity portions information for distributing the storage entity portions between all storage systems of the group so that each storage system of the group eventually receives the storage entity portions; transmitting the storage entity portions, from the given storage system, to storage systems of the group; wherein the transmitting may include transmitting different storage entity portions from the given storage system to different storage systems of the group; sending, by the given storage system, the storage entity portions information to at least some storage systems of the group; and attempting to verify, by the given storage system, that all the storage systems of the group received all the storage entity portions.

The storage entity portions information may indicate distribution paths for sending the storage entity portions between the storage systems of the group.

The sending of the storage entity portions information may include sending the storage entity portions information over paths that are not included in the distribution paths.

The generating of the storage entity portions information may include generating different storage entity portions information for at least two storage systems of the group.

The storage entity portions information may include transmit information for transmitting at least one of the storage entity portions between storage systems of the group.

The storage entity portions information may include retrieval information for retrieving at least one of the storage entity portions.

The storage entity portions information may include reconstructing information for reconstructing the storage entity from the storage entity portions.

The method may include detecting a failure to receive a certain storage entity portion over a certain distribution path and by a certain storage system of the group, and sending the certain storage entity portion to the certain storage system over new distribution path that differs from the certain distribution path.

The method may include detecting a failure to receive a certain storage entity portion over a certain distribution path and by a certain storage system of the group, and re-sending the certain storage entity portion to the certain storage system over the certain distribution path.

There may be provided a computer program product that stores instructions that once executed by a computer causes the computer to replicate a storage entity to a group of storage systems, by: splitting the storage entity, by a given storage system, to provide storage entity portions; generating, by the given storage system, storage entity portions information for distributing the storage entity portions between all storage systems of the group so that each storage system of the group eventually receives the storage entity portions; transmitting the storage entity portions, from the given storage system, to storage systems of the group; wherein the transmitting may include transmitting different storage entity portions from the given storage system to different storage systems of the group; sending, by the given storage system, the storage entity portions information to at least some storage systems of the group; and attempting to verify, by the given storage system, that all the storage systems of the group received all the storage entity portions.

The storage entity portions information may indicate distribution paths for sending the storage entity portions between the storage systems of the group.

The sending of the storage entity portions information may include sending the storage entity portions information over paths that are not included in the distribution paths.

The generating of the storage entity portions information may include generating different storage entity portions information for at least two storage systems of the group.

The storage entity portions information may include transmit information for transmitting at least one of the storage entity portions between storage systems of the group.

The storage entity portions information may include retrieval information for retrieving at least one of the storage entity portions.

The storage entity portions information may include reconstructing information for reconstructing the storage entity from the storage entity portions.

The computer program product that stores instructions for detecting a failure to receive a certain storage entity portion over a certain distribution path and by a certain storage system of the group, and sending the certain storage entity portion to the certain storage system over new distribution path that differs from the certain distribution path.

The computer program product that stores instructions for detecting a failure to receive a certain storage entity portion over a certain distribution path and by a certain storage system of the group, and re-sending the certain storage entity portion to the certain storage system over the certain distribution path.

There may be provided a storage system that may include a storage medium, a controller for controlling the storage medium and a communication module; wherein the controller is configured to (a) split a storage entity to provide storage entity portions, and (b) generate storage entity portions information for distributing the storage entity portions between all storage systems of a group so that each storage system of the group eventually receives the storage entity portions; wherein the communication module is configured to (a) transmit the storage entity portions to storage systems of the group by transmitting different storage entity portions from the given storage system to different storage systems of the group, and (b) send the storage entity portions information to at least some storage systems of the group; wherein the storage system is configured to attempt to verify that all the storage systems of the group received all the storage entity portions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
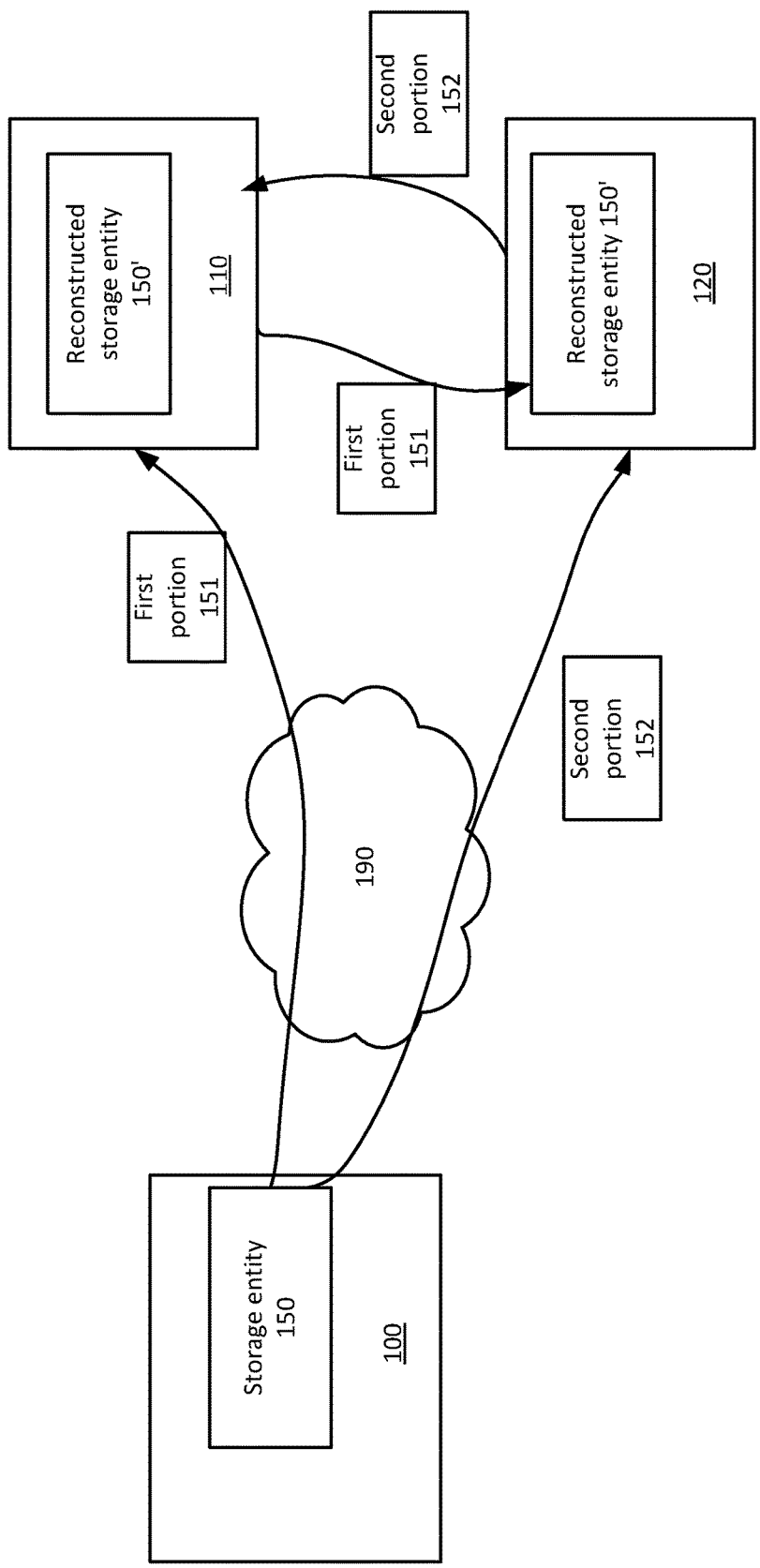
FIG. 1 illustrates an example of storage systems and a network.

In the following detailed description, numerous specific details are set forth in order to provide a thorough understanding of the invention.

However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

The system and method of the present invention handles a delivery of a certain storage entity to multiple destinations, simultaneously and by utilizing the destinations themselves for carrying out the workload balancing of the entire process, in parallel.

The system splits the storage entity, which needs to be copied to multiple destinations, into multiple storage entity portions. All the storage entity portions are supposed to arrive at all participating destinations, where different storage entity portions traverse different paths. The number of storage entity portions may be the same as the number of destinations or smaller. The system (hereinafter, the source system) transmits each storage entity portion to a different destination, so that the entire content is transmitted from the source system, but not towards the same destination.

The source system further sends reconstruction information (also called distribution information) for obtaining the complete storage entity in each destination. For example: the source system may send to each destination, along with a portion transmitted to this destination, instructions for transmitting the portion toward another destination. Alternatively, the source system may send to each destination, details about missing portions (portions that were not addressed to this destination) and the peer-destination from which the missing portion(s) should be requested. The instructions may further include information of how to arrange the portions for reconstructing the whole storage entity at each destination.

Using the reconstruction information, each destination can retrieve from its destination-peers, the missing portions, i.e., those portions that were not retrieved directly from the source system by this destination. When all the portions are retrieved by a certain destination, the entire storage entity can be constructed.

Using this technique, the workload imposed on the source system is alleviated comparing to the one-to-many replication solution. The workload required from the source system is as heavy as would be the workload of sending the content to a single remote destination, particularly, in terms of network bandwidth utilization, since the amount of sent data is exactly the size of a single instance of the storage entity. As for the latency (the time from starting the copying process until the entire content is retrieved by all destinations), since multiple systems (the source system and one or more destination storage systems) participate in distributing the content, the latency is substantially reduced comparing to the cascade copying solution, and in many cases the latency is lower than the latency of sending the content to a single destination.

The cases where the latency of the proposed solution may be even lower than the latency of sending the content to a single destination, may be for example, when different network links connects the source system to different remote destinations (or separate bandwidth is allocated to different remote destinations), then the transmission of the multiple portions can be done in parallel, and therefore may be faster than transmitting the entire content on one network link towards one destination.

The storage entity may be a package of deltas, that is being sent during remote replication. The delta package may include a single update (which may include, e.g., a file, a portion of a file, a directory, a set of files, etc.) that occurred in a source storage unit (e.g., a volume), or the delta package may include multiple deltas that represent differences in the content of the source storage unit that occurred between a current cycle of an asynchronous replication and a previous cycle. The storage entity can be any data content other than a delta package of a remote replication. For example, the storage entity may be a volume partition, a file, a group of files, a section of a file, a database table, or any other information that is to be distributed to multiple destinations.

A storage entity is a group of bits that is stored in a storage system. The storage entity may or may not be an atomic unit (or a non-atomic unit) for memory management operations.

FIG. 1 illustrates a source storage system 100 that replicates a storage entity 150, towards two destination storage systems 110 and 120. Destination storage systems 110 and 120 may be remotely located from source storage system 100—and may be referred to as remote sites.

Any of these storage systems may be a mass storage system that has a storage capability that exceeds 250, 500 or even 1000 terabytes.

Each storage system includes hardware components such as but not limited to a storage medium, a controller for controlling the storage medium and a communication module. The storage medium may include cache memory units and/or permanent storage layers (disk drives, SSD drives and the like). The controller maybe a hardware controller such as but not limited to a server. The communication module may be a hardware communication module that may include a communication controller, ports, buffers and the like. A non-limiting example of a storage system may be Infinibox™ of Infinidat Ltd.

Storage systems 110 and 120 form a group of destination storage systems.

The storage entity may include any content—data, metadata, and the like. The storage entity needs to be copied to destination storage systems 110 and 120.

Source storage system 100 divides storage entity 150 into two portions.

A first portion 151 is sent from source storage system 100 to destination storage system 110 and a second portion 152 is sent from source storage system 100 to destination storage system 120.

The number of portions may be the same as the number of remote sites, which equals two in this example. It is noted that the number of destinations may exceeds two and the number of portions may exceed two.

The number of portions may be smaller than the number of remote sites, and in such case, there may be at least one remote site that would not receive a portion from the source system, but only from its peers.

Source storage system 100 may divide the storage entity into equal or unequal portions. The dividing may be dependent on characteristics or capabilities of each of the remote sites, e.g., the network resources towards each site, the computing capabilities of each site, the current workload in each site, etc., so that a destination storage system having more capabilities or resources may get a larger portion (or more than one portion) than a site with less capabilities or resources.

In addition to the transmission of the portions, the source storage system also sends storage entity portions information.

The storage entity portions information may include distribution information for distributing the portions between all storage systems of the group so that each storage system of the group eventually receives the portions. The distribution information may include (a) transmit information for transmitting at least one of the portions between storage systems of the group, and/or (b) retrieval information for retrieving at least one of the portions.

The storage entity portions information may include reconstructing information for reconstructing the storage entity from the portions.

The transmit information may or may not include transmit instructions.

The retrieval information may or may not include retrieve instructions.

The reconstructing information may or may not include reconstruction instructions.

The storage entity portions information may be included in the portions, may be sent along the same paths as the portions or may be sent over different paths than the portions. For example—control links may be used to transfer the storage entity portions information while data links may be used to transfer the portions. Yet for another example—data links may be used to convey both the portions and the storage entity portions information.

It should be noted that the transmit information and/or the retrieval information may include the destinations of the portions and that the paths between destination storage systems that convey the portions may or may not be defined in the storage entity portions information, may or may not be defined by the source storage system.

The storage entity portions information may include, for example, information about the location of the portion within the complete storage entity and the portion's size.

The storage entity portions information received by each destination storage system may describe how to obtain missing portions (portions that were not sent directly from the source storage system to the destination) and how to reconstruct the entire storage entity in each destination storage system.

The storage entity portions information may describe the total number of portions, and for each portion: the identity of the destination storage system that is responsible for the distribution of the portion and the offset of the portion within the whole storage entity.

Source storage system 100 may send to destination storage system 110 transmit information that includes an identifier of a destination-peer (i.e., another destination storage system) towards which destination storage system 110 should send first portion 151. In this case, the destination-peer is destination storage system 120.

In the same manner, source storage system 100 sends to destination storage system 120 transmit information that includes an identifier of destination storage system 110, as a destination-peer towards which destination storage system 120 should send second portion 152.

According to yet another embodiment, source storage system 100 may send to destination storage system 110 retrieve information identifying a secondary source peer from whom destination storage system 110 should retrieve the remaining portions. In this case the retrieve information may identify that the remaining portions include second portion 152 that is to be retrieved from destination storage system 120. In addition, source storage system 100 may send to destination storage system 120 retrieve information indicating that first portion 151 is to be retrieved from destination storage system 110.

When a portion sent from the source system is retrieved by a destination storage system, each destination storage system sends the retrieved storage entity portion to its peer(s).

Destination storage system 110 sends first storage entity portion 151 to destination storage system 120. The sending is either solicited by destination storage system 120 (if destination storage system 120 utilizes the retrieve information from the source storage system for requesting first storage entity portion 151) or unsolicited (if destination storage system 110 utilizes the transmit-information from the source storage system). In a similar manner, destination storage system 120 sends second storage entity portion 152 to destination storage system 110.

Once storage entity portion 152 has been retrieved by destination storage system 110, it can determine that it has obtained all the portions that can compose the entire storage entity. In this case, first portion 151 was obtained from source storage system 100 and second portion 152 was obtained from destination storage system 120. Destination storage system 110 can now reconstruct an entire reconstructed storage entity 150', utilizing the reconstruction information and portions 151, 152. Reconstructed storage entity 150' is the same content as storage entity 150 on the source storage system. In a similar manner, destination storage system 120 determines that it has obtained all the portions that can compose the entire storage entity and reconstruct reconstructed storage entity 150'.

Destination storage systems 110 and 120 can report to source storage system 100 the completion of receiving all the portions, or may report on a reception of each portion. Destination storage system 110 or 120 may report a failure to obtain one or more portions, e.g., when a certain portion expected to be retrieved was not retrieved within a certain time window. Alternatively, source storage system 100 may detect that one or more portions were not retrieved by one or more destination storage systems, for example, when an acknowledgment was not retrieved.

Source storage system 100 may decide how to react to a failure to retrieve a certain portion by a certain destination storage system. Source storage system 100 may decide to retransmit the missing portion by itself, or may request another destination storage system to resend the portion.

For example, suppose it is determined that destination storage system 110 did not retrieve portion 152. If source storage system 100 determines that destination storage system 120 already reported the completion of reconstructing the reconstructed storage entity 150', then source storage system 100 may request destination storage system 120 to retransmit portion 152, or may request destination storage system 110 to request portion 152 from destination storage system 120.

Alternatively, if destination storage system 120 has not yet reported about a completion of reconstructing the reconstructed storage entity 150' or has not yet reported about a reception of any storage entity portion, then it can be assumed that either destination storage system 120 is overloaded or more loaded than destination storage system 110, or otherwise—non-operational. In this case source storage system 100 may decide to transmit portion 152 by itself to destination storage system 110.

In FIG. 1 first portion 151 is sent from destination storage system 110 to destination storage system 120 over a first path and second portion 152 is sent to destination storage system 110 from destination storage system 120 over a second path.

Figure 2:
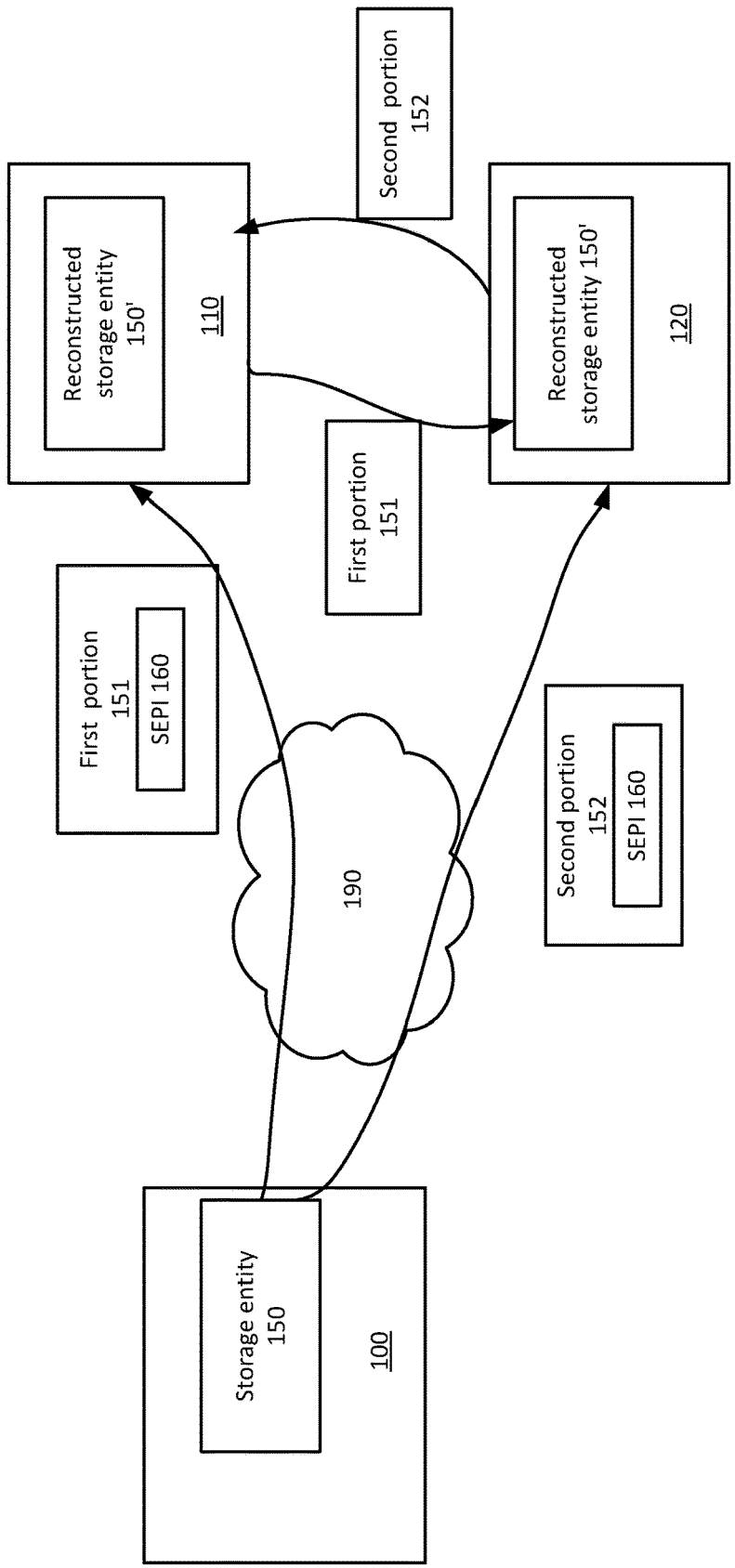
FIG. 2 illustrates an example of storage systems and a network.

FIG. 2 illustrates a source storage system 100 that replicates a storage entity 150, towards two destination storage systems 110 and 120.

FIG. 2 illustrates the storage entity portions information (SEPI) 160 as being included in each one of the first and second portions 151 and 152. The same SEPI 160, in this example, is sent to both destination storage systems 110 and 120 and may include, for example, a list of the two portions, and may indicate that portion 151 is to be distributed by destination storage systems 110 and portion 152 may be distributed by destination storage systems 120.

Figure 3:
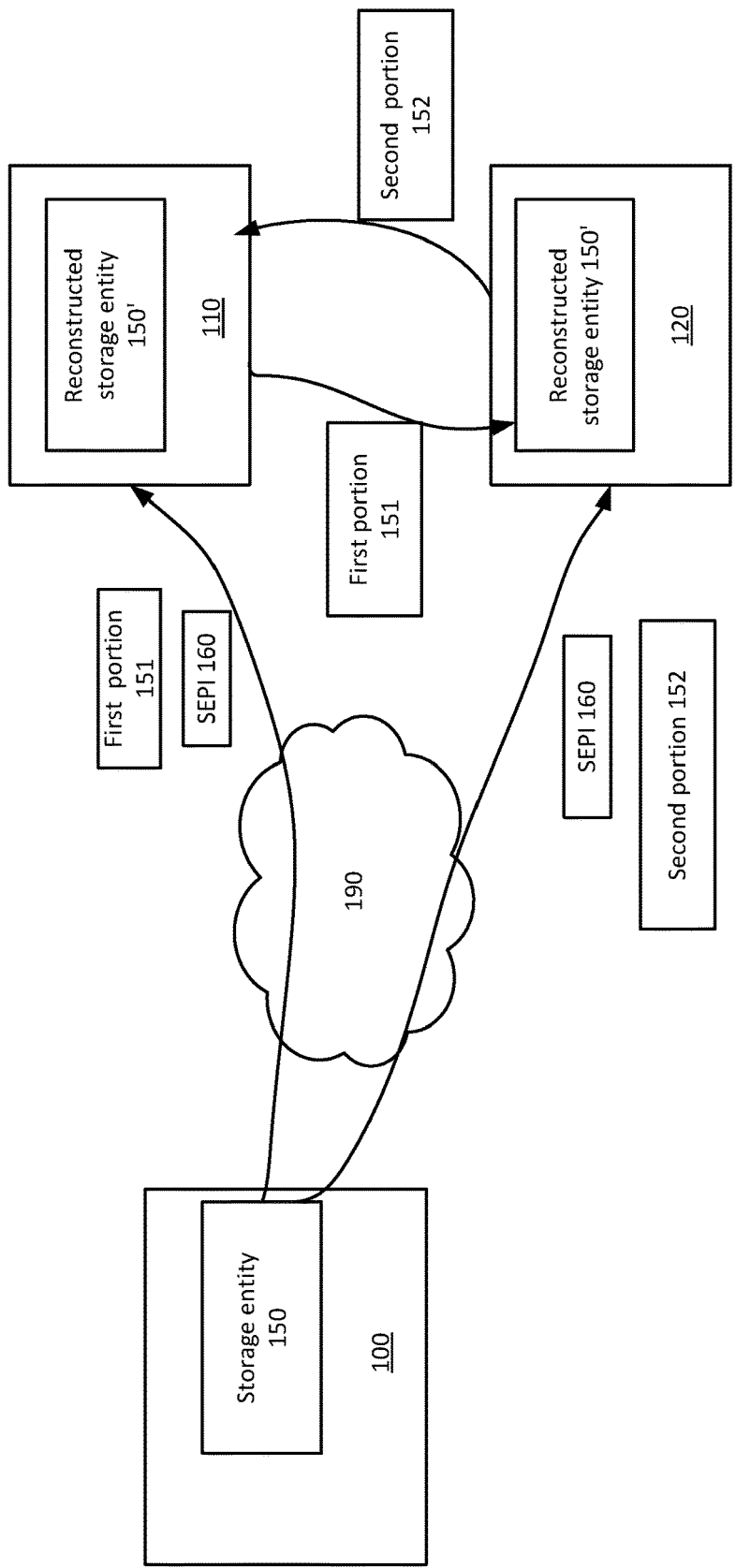
FIG. 3 illustrates an example of storage systems and a network.

FIG. 3 illustrates a source storage system 100 that replicates a storage entity 150, towards two destination storage systems 110 and 120.

FIG. 3 illustrates the storage entity portions information (SEPI) 160 as not being included in each one of the first and second portions 151 and 152. SEPI 160 and first portion 151 propagate over the same path to destination storage system 110. SEPI 160 and second portion 152 propagate over the same path to destination storage system 120.

Figure 4:
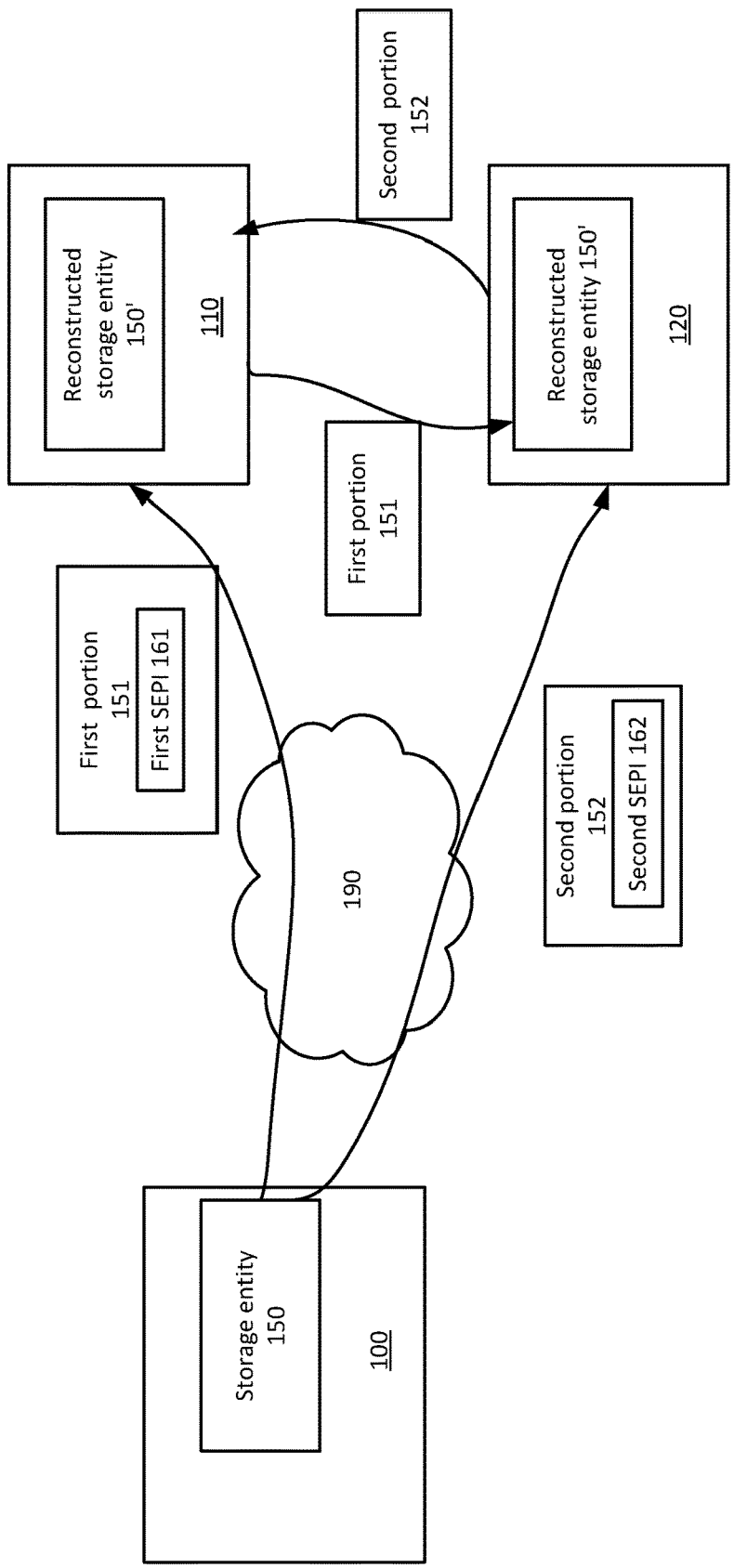
FIG. 4 illustrates an example of storage systems and a network.

FIG. 4 illustrates a source storage system 100 that replicates a storage entity 150, towards two destination storage systems 110 and 120.

FIG. 4 illustrates first SEPI 161 as being included in first portion 151. Second SEPI 162 is included in second portion 152.

First SEPI 161 may differ from second SEPI 162 or may equal to second SEPI 162.

For example, first SEPI 161 may include transmit information for transmitting first portion 151 to second destination storage system 120 and/or retrieval information for retrieving second portion 152 from second destination storage system 120.

For example, second SEPI 162 may include transmit information for transmitting second portion 152 to first destination storage system 110 and/or retrieval information for retrieving first portion 151 from first destination storage system 110.

Figure 5:
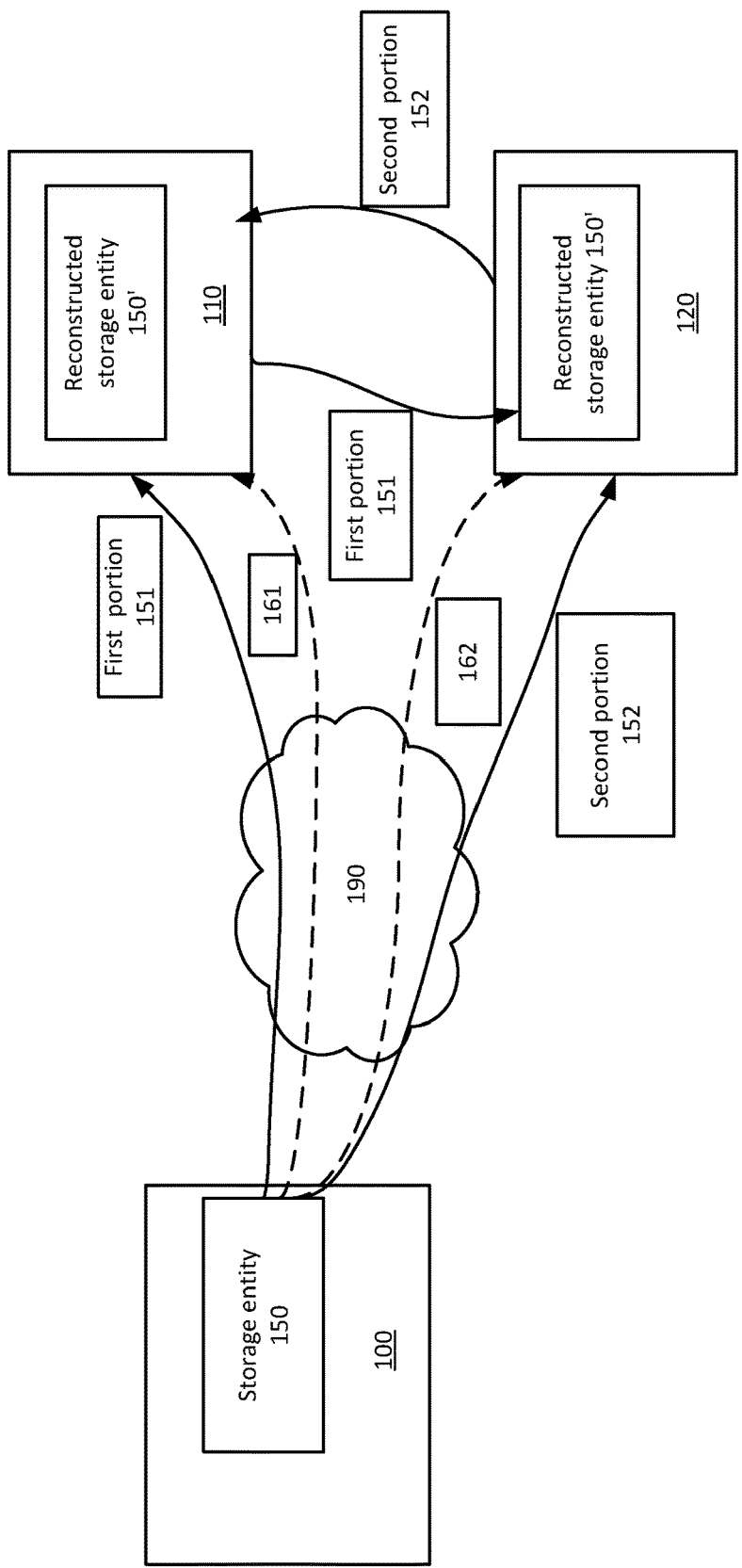
FIG. 5 illustrates an example of storage systems and a network.

FIG. 5 illustrates a source storage system 100 that replicates a storage entity 150, towards two destination storage systems 110 and 120.

FIG. 5 illustrates first SEPI 161 as being transferred over different path from first portion 151. Second SEPI 162 as being transferred over different path from second portion 152.

Figure 6:
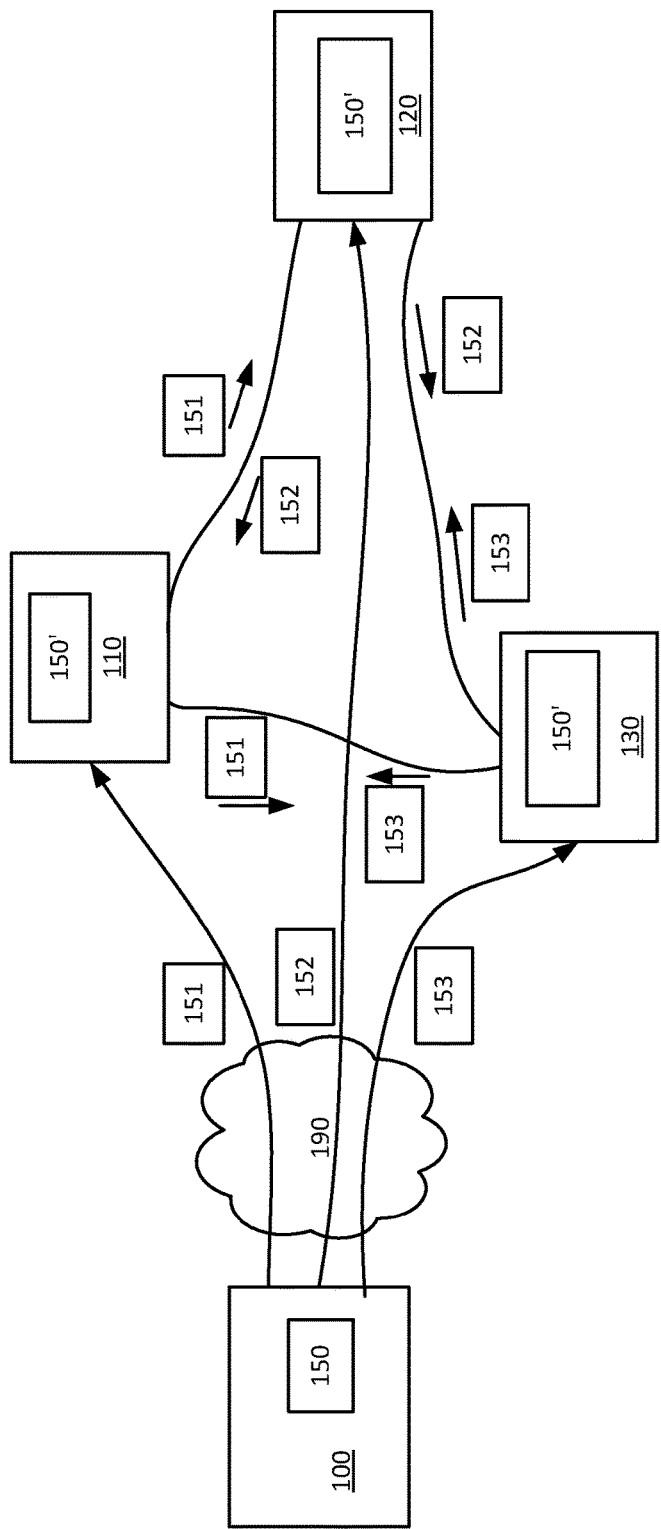
FIG. 6 illustrates an example of storage systems and a network.

FIG. 6 illustrates source storage system 100 that replicates a storage entity 150, towards three destination storage systems 110, 120 and 130.

First, second and third portions 151, 152 and 153 are sent from source storage system 100 to first, second and third destination storage systems 110, 120 and 130 respectively.

First portion 151 is provided from first destination storage system 110 to second and third destination storage systems 120 and 130.

Second portion 152 is provided from second destination storage system 120 to first and third destination storage systems 110 and 130.

Third portion 153 is provided from third destination storage system 130 to first and second destination storage systems 110 and 120.

Figure 7:
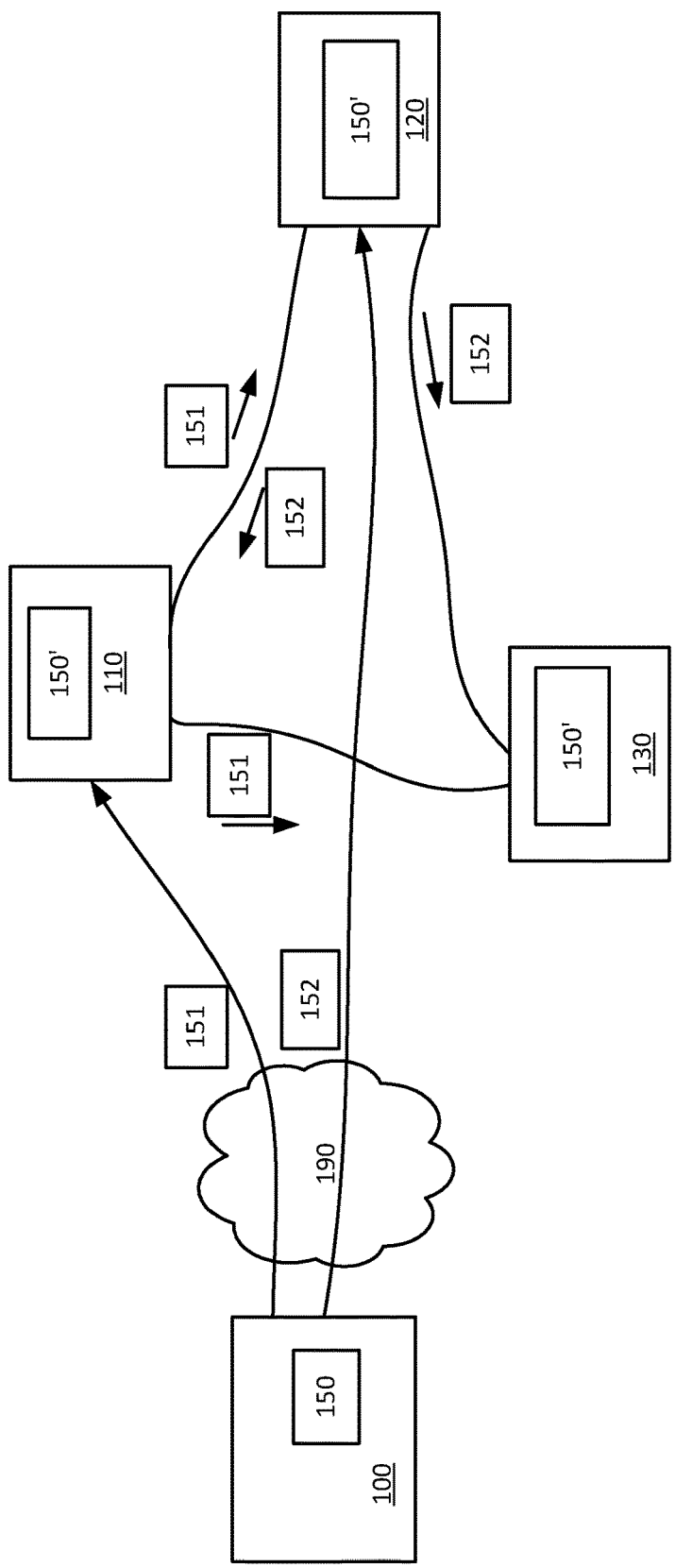
FIG. 7 illustrates an example of storage systems and a network.

FIG. 7 illustrates source storage system 100 and three destination storage systems 110, 120 and 130.

First and second portions 151, 152 are sent from source storage system 100 to first and second destination storage systems 110 and 120 respectively.

First portion 151 is provided from first destination storage system 110 to second and third destination storage systems 120 and 130.

Second portion 152 is provided from second destination storage system 120 to first and third destination storage systems 110 and 130.

Figure 8:
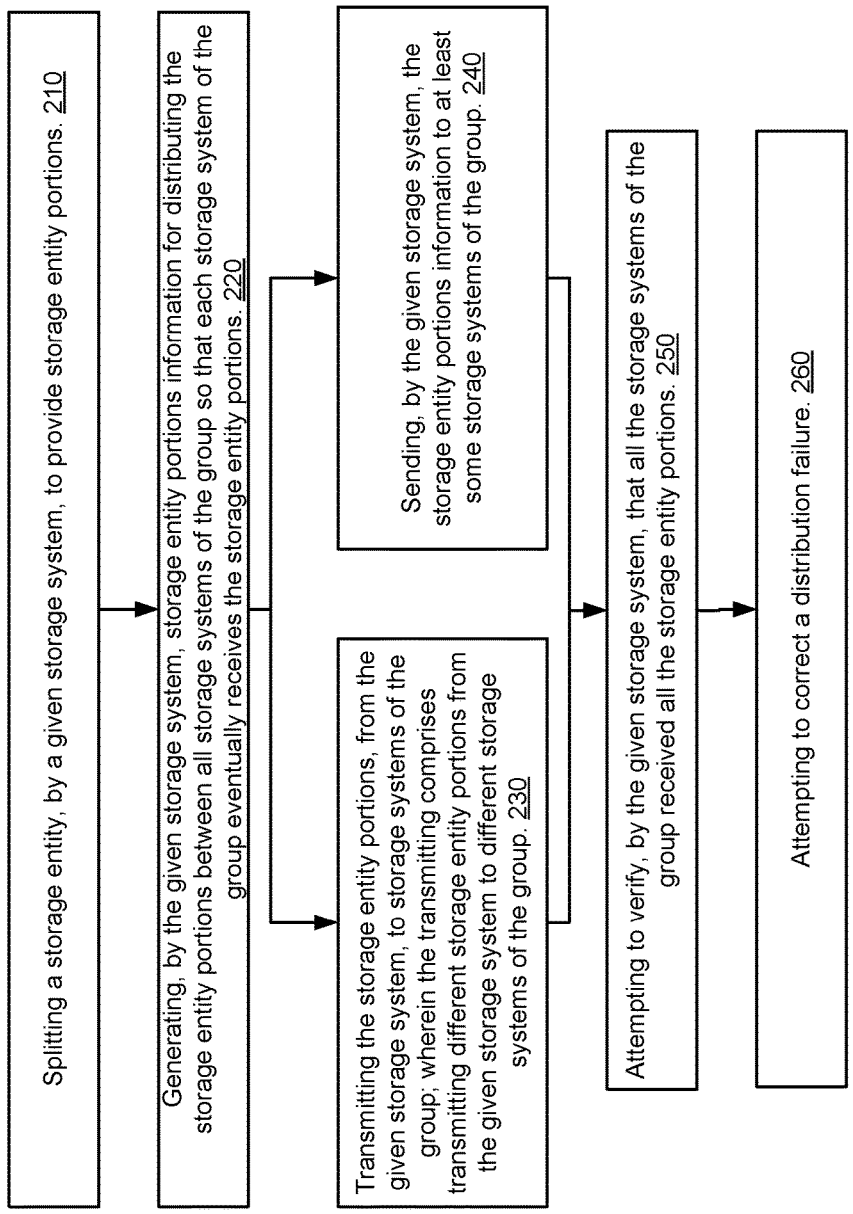
FIG. 8 illustrates an example of a method.

FIG. 8 illustrates an example of method 200.

Method 200 may be provided for replicating a storage entity to a group of storage systems. Method 200 may be executed in a periodic manner and/or in a random manner and/or in response to an occurrence of an event.

Method 200 may start by step 210 of splitting a storage entity, by a given storage system, to provide storage entity portions. The given storage system may be source storage system 100 of FIGS. 1-7.

Step 210 may be followed by step 220 of generating, by the given storage system, storage entity portions information for distributing the storage entity portions between all storage systems of the group so that each storage system of the group eventually receives the storage entity portions.

Step 220 may include generating different storage entity portions information for at least two storage systems of the group.

Step 220 may include generating the same storage entity portions information for at least two storage systems of the group.

The storage entity portions information may include transmit information for transmitting at least one of the storage entity portions between storage systems of the group. The transmit information may be indicative of at least one storage system of the group towards whom the at least one of the storage entity portions is to be transmitted, by the storage system that received the at least one of the storage entity portions, from the given storage system.

The storage entity portions information may include retrieval information for retrieving at least one of the storage entity portions. The retrieval information may be indicative of a storage system of the group from whom the at least one of the storage entity portions is to be retrieved.

The storage entity portions information may include reconstructing information for reconstructing the storage entity from the storage entity portions. The reconstructing information may be indicative of the order of the storage entity portions within the storage entity.

The storage entity portions information may indicate distribution paths for sending the storage entity portions between the storage systems of the group. A distribution path may include only a pairing between storage systems of the group (for example—destination storage system A may send the storage entity portion to destination system B, or—destination storage system A may send the storage entity portion to destination storage system B via destination storage system C), or may be more specific—and may indicate communication links, networks, ports or lower level information.

The number of storage systems of the group may exceed a number of distribution paths, may equal the number of distribution paths or may be smaller than the number of distribution paths.

Step 220 may be followed by steps 230 and 240.

Step 230 may include transmitting the storage entity portions, from the given storage system, to storage systems of the group; wherein the transmitting comprises transmitting different storage entity portions from the given storage system to different storage systems of the group;

Step 240 may include sending, by the given storage system, the storage entity portions information to at least some storage systems of the group.

Step 240 may include sending of the storage entity portions over the distribution paths (of the portions) or over different paths.

Steps 230 and 240 may be followed by step 250 of attempting to verify, by the given storage system, that all the storage systems of the group received all the storage entity portions.

Step 250 may include awaiting to receive reception acknowledgments from members of the group—acknowledging the reception of the portions, may include requesting from members of the group to send such acknowledgements, and the like.

Step 250 may include detecting a distribution failure—a failure to receive a certain storage entity portion over a certain distribution path and by a certain storage system of the group. The distribution failure can be detected upon: receiving a non-acknowledgement from a storage system of the group that reports a non-received certain storage entity portion, not receiving any acknowledgement from a storage system of the group with regard to at least one storage entity portion, within a certain time period, etc.

Step 250 may be followed by step 260 of attempting to correct a distribution failure.

Step 260 may include sending the certain storage entity portion to the certain storage system over new distribution path that differs from the certain distribution path.

Step 260 may include re-sending the certain storage entity portion to the certain storage system over the certain distribution path.

Step 260 may include instructing one or more members of the group to send the certain storage entity portion to the certain storage system.

The terms "including", "comprising", "having", "consisting" and "consisting essentially of" are used in an interchangeable manner. For example—any method may include at least the steps included in the figures and/or in the specification, only the steps included in the figures and/or the specification.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

More, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for replicating a storage entity to a group of storage systems, the method comprises:
    splitting the storage entity, by a given storage system, to provide storage entity portions;
    generating, by the given storage system, storage entity portions information for distributing the storage entity portions between all storage systems of the group so that each storage system of the group eventually receives the storage entity portions;
    transmitting the storage entity portions, from the given storage system, to storage systems of the group; wherein the transmitting comprises transmitting different storage entity portions from the given storage system to different storage systems of the group;
    sending, by the given storage system, the storage entity portions information to at least some storage systems of the group; and
    determining, by the given storage system, whether all the storage systems of the group received all the storage entity portions.

2. The method according to claim 1, wherein the storage entity portions information indicates distribution paths for sending the storage entity portions between the storage systems of the group.

3. The method according to claim 2, wherein the sending of the storage entity portions information comprises sending the storage entity portions information over paths that are not included in the distribution paths.

4. The method according to claim 1, wherein the generating of the storage entity portions information comprises generating different storage entity portions information for at least two storage systems of the group.

5. The method according to claim 1, wherein the storage entity portions information comprises transmit information for transmitting at least one of the storage entity portions between storage systems of the group.

6. The method according to claim 1, wherein the storage entity portions information comprises retrieval information for retrieving at least one of the storage entity portions.

7. The method according to claim 1, wherein the storage entity portions information comprises reconstructing information for reconstructing the storage entity from the storage entity portions.

8. The method according to claim 1, comprising detecting a failure to receive a certain storage entity portion over a certain distribution path and by a certain storage system of the group, and sending the certain storage entity portion to the certain storage system over new distribution path that differs from the certain distribution path.

9. The method according to claim 1, comprising detecting a failure to receive a certain storage entity portion over a certain distribution path and by a certain storage system of the group, and re-sending the certain storage entity portion to the certain storage system over the certain distribution path.

10. A computer program product that comprises a non-transitory computer readable medium, and stores instructions that once executed by a computer causes the computer to replicate a storage entity to a group of storage systems, by:
    splitting the storage entity, by a given storage system, to provide storage entity portions;
    generating, by the given storage system, storage entity portions information for distributing the storage entity portions between all storage systems of the group so that each storage system of the group eventually receives the storage entity portions;
    transmitting the storage entity portions, from the given storage system, to storage systems of the group; wherein the transmitting comprises transmitting different storage entity portions from the given storage system to different storage systems of the group;
    sending, by the given storage system, the storage entity portions information to at least some storage systems of the group; and
    determining, by the given storage system, whether all the storage systems of the group received all the storage entity portions.

11. The computer program product according to claim 10, wherein the storage entity portions information indicates distribution paths for sending the storage entity portions between the storage systems of the group.

12. The computer program product according to claim 11, wherein the sending of the storage entity portions information comprises sending the storage entity portions information over paths that are not included in the distribution paths.

13. The computer program product according to claim 10, wherein the generating of the storage entity portions information comprises generating different storage entity portions information for at least two storage systems of the group.

14. The computer program product according to claim 10, wherein the storage entity portions information comprises transmit information for transmitting at least one of the storage entity portions between storage systems of the group.

15. The computer program product according to claim 10, wherein the storage entity portions information comprises retrieval information for retrieving at least one of the storage entity portions.

16. The computer program product according to claim 10, wherein the storage entity portions information comprises reconstructing information for reconstructing the storage entity from the storage entity portions.

17. The computer program product according to claim 10, that stores instructions for detecting a failure to receive a certain storage entity portion over a certain distribution path and by a certain storage system of the group, and sending the certain storage entity portion to the certain storage system over new distribution path that differs from the certain distribution path.

18. The computer program product according to claim 10, that stores instructions for detecting a failure to receive a certain storage entity portion over a certain distribution path and by a certain storage system of the group, and re-sending the certain storage entity portion to the certain storage system over the certain distribution path.

19. A storage system that comprises a storage medium, a controller for controlling the storage medium and a communication module;
    wherein the controller is configured to (a) split a storage entity to provide storage entity portions, and (b) generate storage entity portions information for distributing the storage entity portions between all storage systems of a group of storage systems so that each storage system of the group eventually receives the storage entity portions;

wherein the communication module is configured to (a) transmit the storage entity portions to storage systems of the group by transmitting different storage entity portions from the given storage system to different storage systems of the group, and (b) send the storage entity portions information to at least some storage systems of the group;

wherein the storage system is configured to determine whether all the storage systems of the group received all the storage entity portions.

\* \* \* \* \*